United States Patent [19]

Cetas

[11] 4,140,393
[45] Feb. 20, 1979

[54] BIREFRINGENT CRYSTAL THERMOMETER

[75] Inventor: Thomas C. Cetas, Tucson, Ariz.

[73] Assignees: University of Arizona; The United States of American as represented by the U.S. Government, Washington, D.C.

[21] Appl. No.: 794,142

[22] Filed: May 5, 1977

Related U.S. Application Data

[63] Continuation-in-part of Ser. No. 660,349, Feb. 23, 1976, abandoned.

[51] Int. Cl.$^2$ ............................. G01J 5/52; G01J 5/58
[52] U.S. Cl. .................................. 356/43; 73/355 R; 250/474; 356/44
[58] Field of Search .................................. 356/43–45, 356/51; 350/157; 73/355 R, 344, 362.4, 362.8; 128/214; 219/502; 250/225, 474

[56] References Cited

U.S. PATENT DOCUMENTS

| 3,453,434 | 7/1969 | Takami et al. ............ 73/355 R |
| 3,675,125 | 7/1972 | Jaecklin ................... 250/225 |

FOREIGN PATENT DOCUMENTS 1134027  11/1968  United Kingdom ................ 356/43

OTHER PUBLICATIONS

Miller, et al., "Temperature Dependence of the Optical Properties of Ferroelectric LiNbO$_3$ & LiTaO$_3$," Applied Physics Letters, Aug. 1966, pp. 169–171.

Bloem et al., "Immersible Fiber Optic Probe," IBM Tech. Disc. Bull., vol. 18, Jul. 1975, pp. 365–366.

Primary Examiner—John K. Corbin
Assistant Examiner—Wm. H. Punter
Attorney, Agent, or Firm—Martin Novack

[57] ABSTRACT

This invention relates to the use of a birefringent crystal as the sensing element in a probe thermometer constructed of certain basic optical components utilized in three separate modes. Thus, all of the modes of the invention are directed to a probe thermometer which uses the temperature dependence of the birefringence of certain single crystals as the temperature sensitive parameter. One such crystal is a Y-cut single crystal of LiTaO$_3$. Alternative crystals having adequate sensitivity in the desired temperature range may be constructed from LiNbO$_3$ or BaTiO$_3$. Polarized light propagates through the crystal in two modes, the ordinary ray and the extraordinary ray, which have indices of refraction $n^o$ and $n^e$. For LiTaO$_3$ at room temperature, $n = 2.2$, $B = n^e - n^o = 0.004$, and $dB/dT = 4.4 \times 10^{-5}/°$ C. The intensity of light passed through a sandwich of aligned sheet polarizer, crystal, and optical analyzer is a function of B and hence also is temperature dependent. A thermometer probe is constructed by bonding this sandwich to a bundle of optical fibers along with a dielectric mirror so that the sensor will be at the probe tip. The probe has been constructed for use in the presence of intense electromagnetic fields and also designed to eliminate the possible hazard of an electrical leakage back to the subject.

10 Claims, 7 Drawing Figures

BIREFRINGENT CRYSTAL THERMOMETER

This application is a continuation-in-part of pending Ser. No. 660,349 filed Feb. 23, 1976, now abandoned, entitled "Birefringent Crystal Thermometer."

This invention relates to the use of a birefringent crystal as the sensing element in a probe thermometer constructed of certain basic optical components utilized in three separate modes. Thus, all of the modes of the invention are directed to a probe thermometer which uses the temperature dependence of the birefringence of certain single crystals as the temperature sensitive parameter. One such crystal is a Y-cut single crystal of $LiTaO_3$. Alternative crystals having adequate sensitivity in the desired temperature range may be constructed from $LiNbO_3$ or $BaTiO_3$. Polarized light propagates through the crystal in two modes, the ordinary ray and the extraordinary ray, which have indices of refraction $n^o$ and $n^e$. For $LiTaO_3$ at room temperature, $n = 2.2$, $B = n^e - n^o = 0.004$, and $dB/dT = 4.4 \times 10^{-5}/°C$. The intensity of light passed through a sandwich of aligned sheet polarizer, crystal, and optical analyzer is a function of B and hence also is temperature dependent. A thermometer probe is constructed by bonding this sandwich to a bundle of optical fibers along with a dielectric mirror so that the sensor will be at the probe tip. Half of the fibers conduct light from a light source which is a monochromatic light source, such as a light emitting diode (LED) or white light with a suitable filter, to the sensor tip, while the remainder conduct light from the sensor to a light detector which is a photodetector, such as a photodiode, photomultiplier tube, or phototransistor. One example uses a crystal 0.1 mm thick of $LiTaO_3$, with which a temperature range of 33° C. or from 15°-48° C. with a 0.1° C. resolution is attained and another example uses a separate analyzer oriented with its axis perpendicular to that of the polarizer where the analyzer is interposed between the crystal and the dielectric mirror. In this case a satisfactory temperature range of 12.5°-65° C. is achieved.

An alternative configuration utilizes only a single optic bundle, instead of two, leading from a beam splitter to the sensor. The operation of the second configuration is as follows:

Light is generated by a light source, such as a light emitting diode, (LED). The beam splitter generates two light beams, one entering the optical fiber which leads to the sensor and one to be used to generate a reference signal. Light returning from the sensor is reflected by the beam splitter into an optical fiber which leads to a photodetector such as a photodiode. Light from the reference beam can be used to produce a signal which is proportional to the LED output and through known circuitry eliminates the effects of drifting in the LED output.

The reference signal is used to send signals into an optical fiber past a chopper wheel to a mirror and back through the beam splitter to the photodetector. The photodetector signal consists of two time-modulated parts. When the chopper is closed, only the thermometer signal is received. When the chopper is open, the signal is the sum of the thermometer plus reference signals.

A third configuration and an alternate way to use the reference is to send the reference signal via fiber optics to a second photodetector circuit. This method is more facile but requires matched photodetectors and amplifier channels and does not permit the detection or elimination of relative drifting between the two channels.

PRIOR ART

The closest literature prior art are devices manufactured from liquid crystal devices based upon the selective reflection of red light such as disclosed in the following:

C. C. Johnson et al, "Discussion Paper: Fiberoptic Liquid Crystal Probe for Absorbed Radio-Frequency Power and Temperature Measurement in Tissue During Irradiation," (In Biologic Effects of Non-Ionizing Radiation, *Annals of the New York Academy of Sciences*, ed. Paul E. Tyler, 247:527-531, Feb. 1975. This paper discusses a probe that uses the reflectance of red light from a mixture of liquid crystals as the sensitive parameter.

T. C. Rozzell, et al, "A Nonperturbing Temperature Sensor for Measurements in Electromagnetic Fields," *Journal of Microwave Power*, 9:241-249, September 1974.

Illustrative of the use of a solid crystal as in the present device is the following published art:

T. C. Cetas, "A Birefringent Crystal Optical Thermometer for Measurements of Electromagnetically Induced Heating," International Union of Radio Science (URSI) Annual Meeting, October 20-23, 1975, Reports, B11-3, pages 274-276 (Abstract).

In the patent art the following U.S. Pat. is noted: No. 3,453,434 Takami et al. This patent relates to measurement of birefringence (difference in refractory indices in two crystalline directions) at column 4, lines 55-63, but the patentees critically do not measure the temperature of the crystal. Thus, the Takami et al patent is directed to an infrared ray detector rather than to a thermometer probe.

BACKGROUND

The need for new thermometers that can be used in the presence of strong radio frequency electromagnetic fields has been demonstrated dramatically in recent years (See, for example, C. C. Johnson and A. W. Guy, "Non-ionizing Electromagnetic Wave Effects in Biological Materials and Systems," *Proc. of IEEE*, 60:692-718, 1972; and T. C. Cetas, "Temperature Measurement in Microwave Diathermy Fields: Principles and Probes," presented at the International Symposium on Cancer Therapy by Hyperthermia and Radiation, April 28-30, 1975) and developments now are appearing to meet this need. The two basic approaches which have been followed have nearly opposite points of view. One method is to start with a well established thermometric technique, in particular, the use of thermistors. The objective, then, is to reduce the electromagnetically induced heating (both electric dipole and magnetic loop currents) through the use of high resistance leads and by minimizing the area enclosed by the circuitry. Examples of these are the MIC devices (see L. E. Larsen et al, "Microwave Decoupled Brain-temperature Transducer," IEEE Trans. on Microwave Theory Tech. MTT-22, 438-444, 1974) and that described by Bowman (see R. R. Bowman, "A Probe for Measuring Temperature in Radio Frequency Heated Material," presented at the International Microwave Power Symposium, Waterloo, Ontario, May 1975, and IEEE Trans. on Microwave Theory Tech., MTT-24, 43-45, 1976). The other approach has been to begin with materials which do not interact with the electromagnetic radiation and then to make a good thermometer, that is, a device which has the appropriate range, has adequate temperature resolution, and can be calibrated. Probe thermometers following this approach are optical devices which use fiber optics to communicate with the sensor and relate its temperature to the intensity of the light reflected from the sensor. Examples of these are a liquid crystal device which is based on the selective reflection of red light (see C. C. Johnson, et al, Discussion paper: Fiberoptic Liquid Crystal Probe for Absorbed Radio-frequency Power Temperature Measurement in Tissue During Irradiation, (in) Biologic Effects of Non-ionizing Radiation, *Ann. N.Y. Acad. Sci.*, February 1975, 247:527-531; and T. C. Rozzell et al, "A Nonperturbing Temperature Sensor for Measurements in Electromagnetic Fields," *J. of Microwave Power*, 9:241-249, 1974) and the birefringent crystal sensor which is the subject of this patent application. This latter development by T. C. Cetas appears in a paper, "A Birefringent Crystal Optical Thermometer for Measurements of Electromagnetically Induced Heating," which was presented at the International Union of Radio Science (URSI), Boulder, Colorado, October 1975. Two inherent advantages of the birefringent crystal sensor are the stability of the sensor itself (a solid single crystal in contrast to a semi-ordered liquid) and the existence of a simple, physically based, expression to characterize the thermometer calibration.

The present invention consists of three configurations of a probe-type thermometer utilizing a birefringent crystal at the tip of the probe and these variations have been generally described above. As noted above, the first configuration is an assembly of a probe thermometer made by mounting a polarizing disc, a birefringent crystal (anisotropic) with temperature dependent indices of refraction and a mirror at the end of a bundle of optical fibers. Half of the fibers in the bundle lead to a light source such as a light emitting diode, the other half lead to a photodetector, such as a photodiode. Appropriate electronics energize the light emitting diode and amplify and measure the signal received by the photodetector. One difficulty with the device is that a slow drift may occur in the calibration as a result of drifting characteristics of the light source and light detector. The present application discusses another method of assembly which eliminates the effects of drifting electro-optic components.

The second basic configuration is sketched in FIG. 3. Instead of two fiber optic bundles going to the sensor, only one leads from a beam splitter to the sensor. This sensor arrangement is simpler and is easier to construct and to miniaturize.

A third configuration substitutes a second reference photodetector circuit for a chopper and wheel.

PHYSICAL BASIS

The physical basis of the birefringent crystal sensor can be understood (see Born and Wolf, Principles of Optics, 4th ed, Oxford, Pergamon, 1970 pages 694-696) by considering the two orthogonal principal optic axes, D′ and D″, respectively. If a polarizer is placed in front of the crystal and is oriented so that its axis, P, is at angle $\phi$ with respect to the crystal axis, D′, and if an analyzer is placed behind the crystal with its axis, A, at angle, X, with respect to the polarizer P, then the light intensity, I, which passes through the three pieces, is related to the intensity, $I_o$, which is passed by the polarizer, by $$I = I_o (\cos^2 X - \sin 2\phi \sin 2 (\phi - X) \sin^2 \delta/2) \quad (1)$$

The phase shift, $\delta$, between the rays propagated along the two principal axes is given by $$\delta = (2\pi/\lambda) h (n'' - n') \quad (2)$$

where h is the crystal thickness and $\lambda$ is the wavelength of the light. When the polarizer and analyzer axes are parallel (X = 0), Equation 1 becomes $$I = I_o (1 - \sin^2 2\phi \sin^2 \delta/2) \quad (3)$$

The factor $\sin^2 2\phi$ is a constant, $\alpha$, for a particular arrangement of the polarizer, analyzer, and crystal. The ideal case would be for $\phi = \pi/2$ which gives $\alpha = 1$. We assume that the birefringence, $n'' - n'$, depends linearly on the temperature, T, and set $\delta/2 = (T - \theta)$. Hence, $$I = I_o (1 - \alpha \sin^2 \beta (T - \theta)) \quad (4)$$

where $\theta$, $\alpha$, $\beta$, and $I_o$ are calibration constants for an individual optical thermometer. Once these are determined, temperatures, T(I) can be calculated from measured values of I by inverting Equation (4) to yield $$T(I) = \theta + (1/\beta) \sin^{-1} ((I-I_o)/I_o \alpha)^{\frac{1}{2}} \quad (5)$$

Equation (4) is a multiple-valued function of the temperature and so some provisions must be made to determine unique temperatures from measurements of I. One approach is to select the parameters h, $\lambda$, n′ and n″ (or $\beta$ and $\theta$) such that only one-half of the sine function is covered in the temperature region of interest, say, 15 to 50° C. Alternatively, the parameters could be chosen so that the maxima in the function repeat frequently with temperature, e.g., every degree. Then an unknown temperature would be determined by counting the number of maxima from some reference temperature (as in fringe counting in interferometry) with interpolation between maxima for finer resolution.

The birefringence of a Y-cut single crystal disc of lithium tantalate (LiTaO$_3$) shows a rather large temperature dependence (see Miller and Savage, "Temperature Dependence of the Optical Properties of Ferroelectric LiNbO$_3$ and LiTaO$_3$," *Appl. Phys. Lett.*, 9:169, 1966). In particular, for this material, n″ $\simeq$ n′ + 2.18, n″ − n′ = 4.4 × 10$^{-3}$ near room temperature and d(n″ − n′)/dT = 4.5 × 10$^{-5}$/° C. If red light ($\lambda$ = 660 nm) is used to sense the birefringence of a 0.2 mm thick crystal, $\delta/2$ will range from $\pi$ radians near 12.3° C. to $3\pi/2$ radians near 49° C.

THERMOMETER CONSTRUCTION

Figure 1:
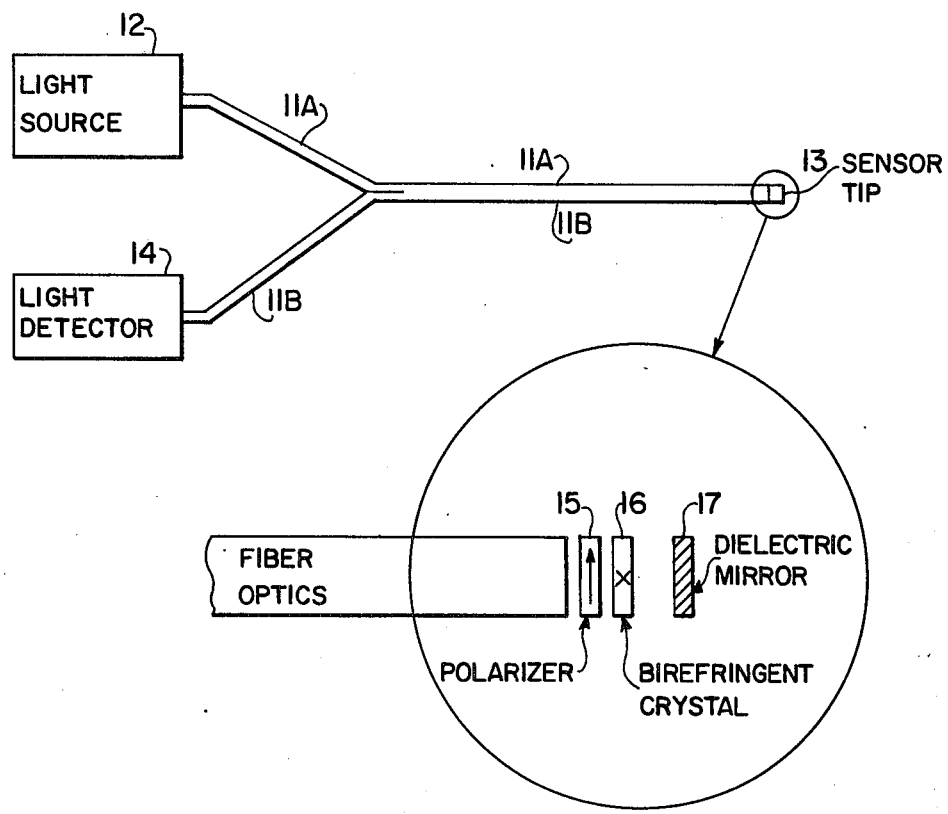
FIGS. 1 and 2 are schematics of two examples of methods of assembly of the first configuration of this invention showing a split optical bundle.
Figure 2:
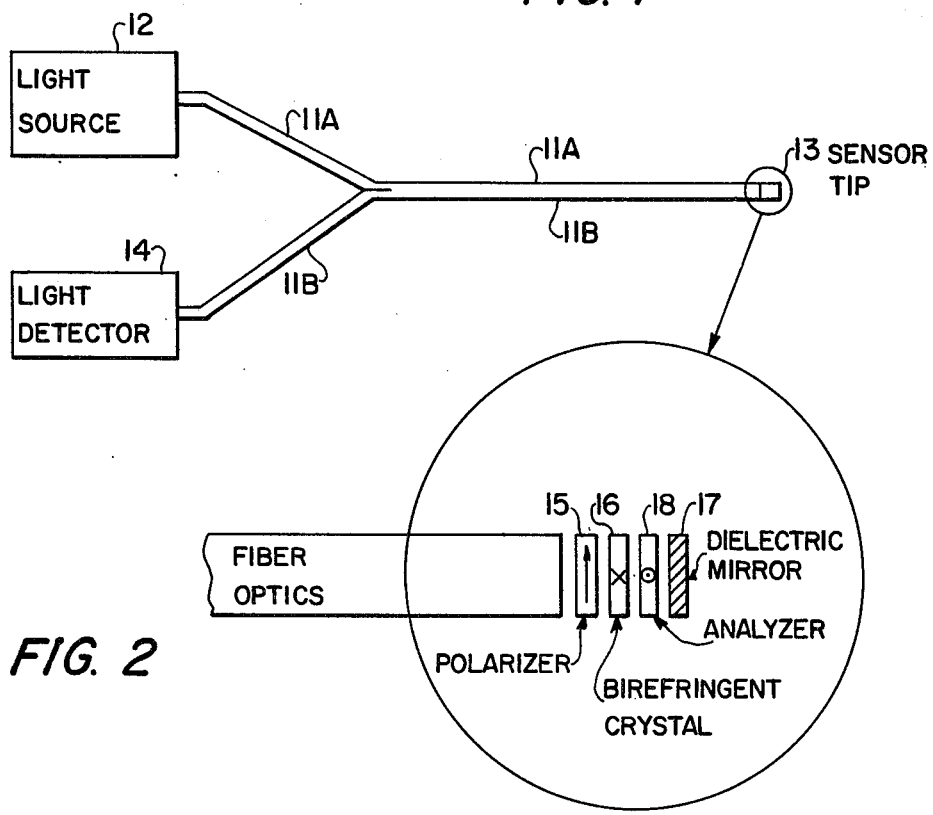

Several thermometers have been constructed according to the ideas suggested above. FIGS. 1 and 2 are schematic representations of two examples of methods of assembly. A bundle of optical fibers was bifurcated such that half of the fibers, 11A, went to a light source, 12, and half, 11B, went to a photodetector, 14. At the sensor end, 13, where the source and detector fibers were well randomized, the bundle was potted in clear epoxy and ground flat. In the first example, FIG. 1, a sandwich composed of a properly aligned dichroic polarizer, 15, the crystal, 16, and a mirror, 17, was bonded to the tip. In this prototype, the crystal was 0.1 mm thick (optical thickness was 0.2 mm) and the light source was a red light emitting diode ($\lambda$ = 660 nm). The useful temperature range was 15 to 48° C. The sensitivity of this thermometer was better than 0.1° C. The diameter of the discs (polarizer, crystal, and mirror) were 2 mm, but this is not restrictive; these could be reduced.

In the second example, FIG. 2, a second polarizing film, the analyzer, 18, is inserted between the crystal and the mirror. The orientation of its optical axis is perpendicular to that of the polarizer, 15. A mathematical analysis similar to that above leads to a dependence of the reflected light on the fourth power of the cosine of the phase shift $\delta$ (Equation 2), where, in this case, the optical thickness, h, is the same as the physical thickness of the crystal. This configuration led to a useful temperature range of 15 to 65° C. for the thermometer.

In the above, the apparatus is utilized by pulsing the LED, which permits greater drive currents and results in greater light intensity. In the present first configuration, the LED and photodiode are potted in the body of BNC connectors with the optical fibers butted and potted tightly to them. Thus, the thermometer probes are terminated electrical connections rather than optical ones which are more difficult to reassemble reproducibly.

Figure 3:
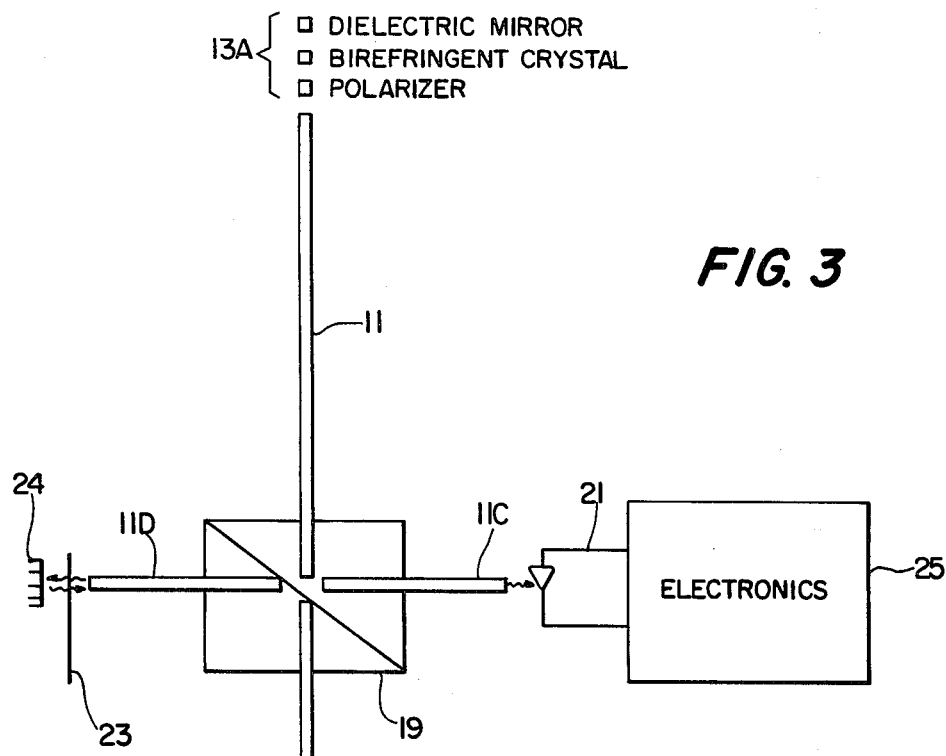
FIG. 3 depicts a diagramatic illustration of a single optical bundle and beam splitter embodying a second configuration of this invention and with reference signal via chopper wheel.

The improved configuration, illustrated in FIG. 3, overcomes the effect of drifting electro-optic components. As shown in FIG 3, instead of two fiber optic bundles going to the sensor 13A, only one leads from a beam splitter to the sensor 13A. The sensor arrangement of FIG. 3 is simpler than that of FIG. 2 and thus is easier to construct and to miniaturize. The operation is as follows: Light is generated by a light source 12A, such as a light emitting diode (LED). The beam splitter 19 generates two light beams, one entering the optical fiber bundle 11 which leads to the sensor 13A and a second beam used to generate a reference signal. Light returning from the sensor 13A is reflected by the beam splitter 19 into an optical fiber 11C which leads to a photodetector 21 such as a photodiode. Light from the reference beam can be used to produce a signal which is proportional to the LED output and hence through proper circuitry eliminates the effects of drifting in the LED output.

One alternative in using the reference signal is to send the reference signal into an optical fiber bundle 11D past a chopper wheel 23 to a mirror 24 and back through the beam splitter 19 to the photodetector 21. This is illustrated in FIG. 3 where the light is guided through optical fibers to each of the components.

As one form of the device, the photodetector signal consists of two time modulated parts. When the chopper 23 is closed, only the thermometer signal is received by photodetector 21. When the chopper is open, the signal received by photodetector 21 is the sum of the thermometer plus reference signals. Appropriate electronics 25, described hereinafter, operate on these signals to yield an output which is proportional to the ratio of the thermometer signal to reference signal.

Figure 6:
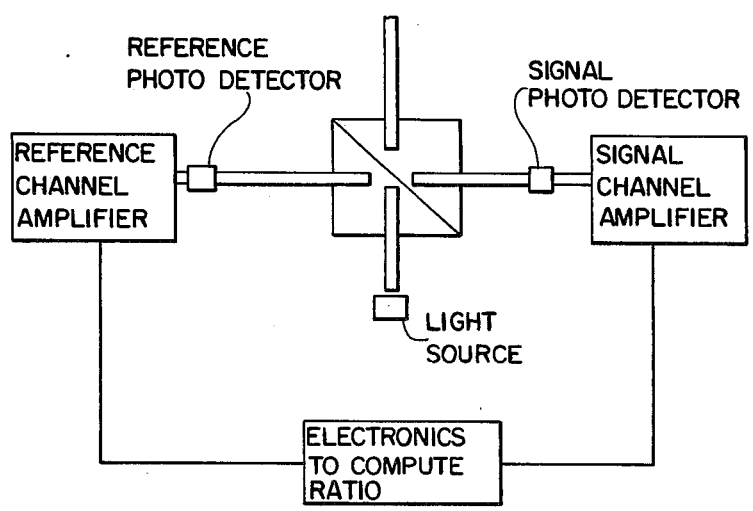
FIG. 6 is a diagramatic sketch of the third configuration showing a reference signal utilizing a second photodetector circuit.

An alternative method of using the reference is to send the reference signal via fiber optics to a second photodetector circuit (see FIG. 6). This method is simpler but requires matched photodetectors and matched dual amplified channels. It does not permit the detection or elimination of relative drifting between the two channels.

Figure 4:
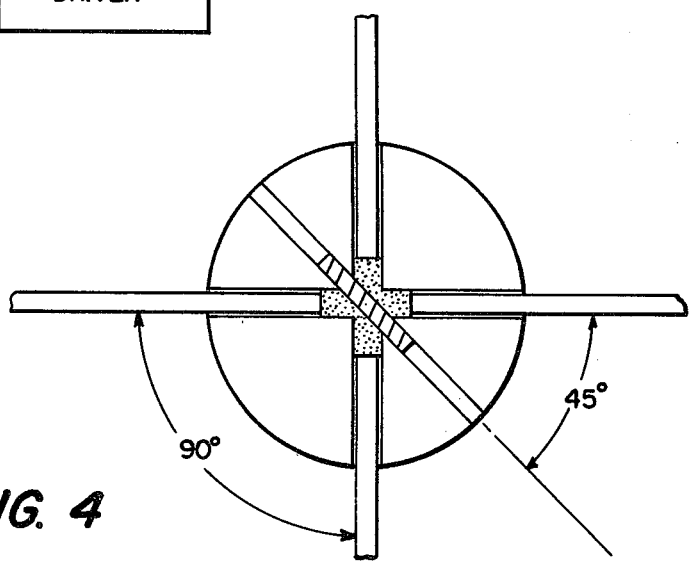
FIG. 4 is a diagram of the beam splitter optical fiber arrangement.

FIG. 4 illustrates an alternative method of constructing the beam splitter optical fiber arrangement. In this arrangement the materials should have about the same index of refraction so that spurious optical reflections from interfaces are minimized.

Figure 5:
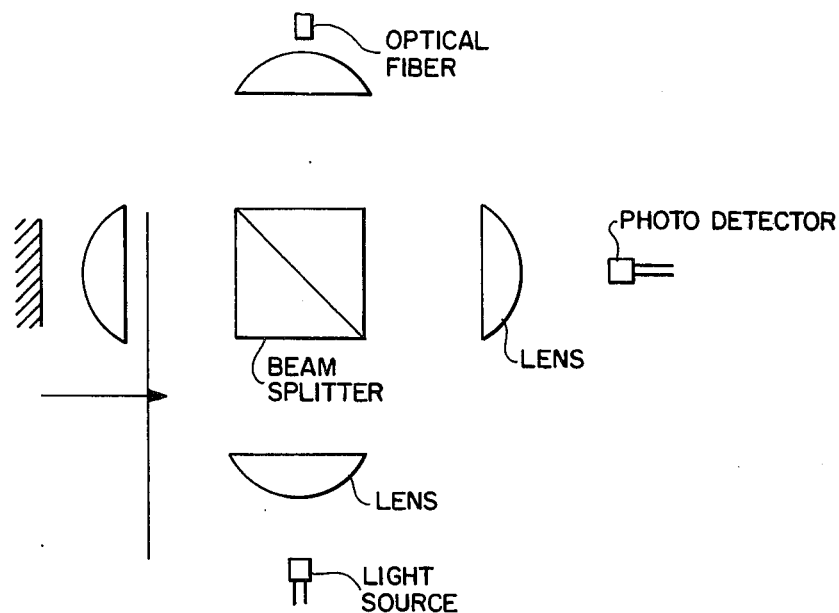
FIG. 5 is a diagramatic sketch of a beam splitter using a lens system.

A second alternative form of the beam splitter arrangement is shown in FIG. 5 in which the light is guided through a lens system.

DESCRIPTION OF THE ELECTRONIC BLOCK DIAGRAM FOR THE OPTICAL THERMOMETER

Figure 7:
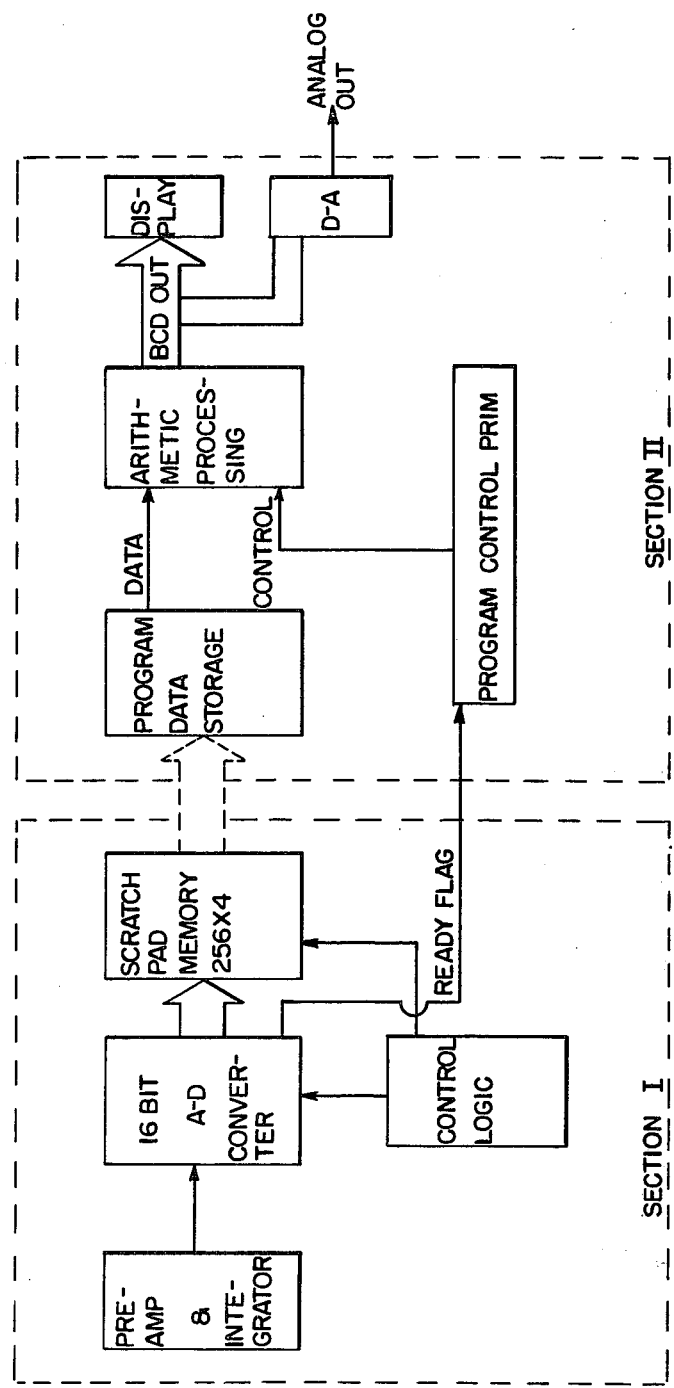
FIG. 7 is a block diagram of an electronic tabulating unit.

The system 25 can be divided into two sections with the PREAMP and INTEGRATOR, A-D Converter, Scratchpad Memory, and Control Logic as Section I. Section II, which is composed of Program Data Storage, Arithmetic Processor, Digital Display, D-A Converter, and Program Control, is essentially a Central Processing Unit that treats the other section as a peripheral device, operates upon the data from the device and presents the resultant data on a digital display as well as in analog form (see FIG. 7).

Section I

The PREAMP and INTEGRATOR section samples and integrates exactly 10 pulses from the optical detector. Upon command of the Control Logic, signals from the temperature modulated beam (sample), from the sample and reference beam combined (sample plus reference), and from the dark current plus analog offset voltages (zero) are read. These signals are digitized sequentially by the A-D converter and are stored in the scratchpad memory.

Section II

Under control of the Program Control Logic which is stored in the PROM memory, the data are transferred to the Program data storage where they are available to be manipulated by the Arithmetic Processor. The Zero reading is subtracted algebraically from sample and sample plus reference. This negates the effects of drifts in the analog circuitry. Next sample is subtracted from sample plus reference. The ratio of sample to reference is computed and the outputs (digital display and analog voltage) are updated.

When the data are transferred to Section II, Section I is triggered simultaneously to begin accumulating new data for the next reading. The period required for each data cycle (that is, the time interval between output dates) is 500 ms.

Alternative Method

Alternative to the circuitry above is replacement of this circuitry with microprocessor techniques. This will permit a reduction in the complexity and cost of the electronics package and at the same time increase its capability to include an output in terms of temperature units (° C.).

I claim:

1. A thermometer comprising a monochromatic light source, a beam splitter, first fiber optic means connecting said light source and said beam splitter, a sensor including a material whose birefringence is temperature dependent, second fiber optic means connecting said beam splitter and said sensor, means for generating a reference signal, third fiber optic means connecting said beam splitter and said reference signal means, an analyzer, fourth fiber optic means connecting said beam splitter and said analyzer whereby light from said light source is directed by said beam splitter to said sensor and said reference signal means, and light returning from said sensor is compared with a signal from said reference signal means by said analyzer.

2. A thermometer probe operating upon the temperature dependence of birefringence of certain anisotropic crystals, comprising: a monochromatic light source; a sensor including a birefringent crystal; fiber optic means for connecting said light source and said sensor whereby light from said light source is conveyed to said sensor and returned therefrom over at least a portion of said fiber optic means; analyzing means; means for generating a reference signal; beam splitting means located intermediate said light source and said sensor; said beam splitting means being coupled via further fiber optic means to said analyzing means and to said means for generating a reference signal, whereby said reference signal is compared to the signal generated in said analyzing means by said returning light.

3. A thermometer for detecting the internal temperature of a body and producing, outside the body, an electrical indication of the temperature, comprising:
a light source;
a probe element positionable internally in the body, said probe element including a temperature-sensitive birefringent crystal and optical means for detecting polarization changes of the light beam and modulating said light beam as a function of said polarization changes;
electro-optical detector means positionable external to the body for converting light to electrical signals; and
an elongated flexible optical guiding medium for optically coupling said light source to said probe element and said probe element to said electro-optical detector means;
reference signal generator means;
beam splitter means coupled between said light source and said probe element and operative to direct a portion of the light from said light source toward said reference signal generator means; and
means for comparing the output of said reference signal generator means with the output of said electro-optical detector means attributable to light from said probe element to produce an output temperature-indicative electrical signal as a function of the comparison.

4. The thermometer as defined by claim 3 wherein said reference signal generator means is operative to chop light from said light source, said beam splitter means is operative to couple the chopped light to said electro-optical detector means, and said comparator means is operative to compare the output of said electro-optical detector means during different half cycles of the chopped light.

5. The thermometer as defined by claim 4 wherein said elongated optical guiding medium comprises a fiber optics guiding medium.

6. The thermometer as defined by claim 5 wherein said probe element includes a mirror at the remote end thereof such that light reflected from said mirror is returned, through said crystal, said optical means and said fiber optics guiding medium, to said electro-optic detector means.

7. The thermometer as defined by claim 6 wherein said crystal is an optical anisotropic single crystal.

8. The thermometer as defined by claim 7 wherein said optical means comprises a polarizer.

9. The thermometer as defined by claim 8 wherein said optical means comprises a polarizer and an analyzer surrounding said crystal.

10. The thermometer as defined by claim 9 wherein said light source is a source of substantially monochromatic light.

* * * * *